May 17, 1927.
C. J. JOHNSON
1,629,106
HANDY MEASURING DEVICE
Filed Aug. 19, 1925
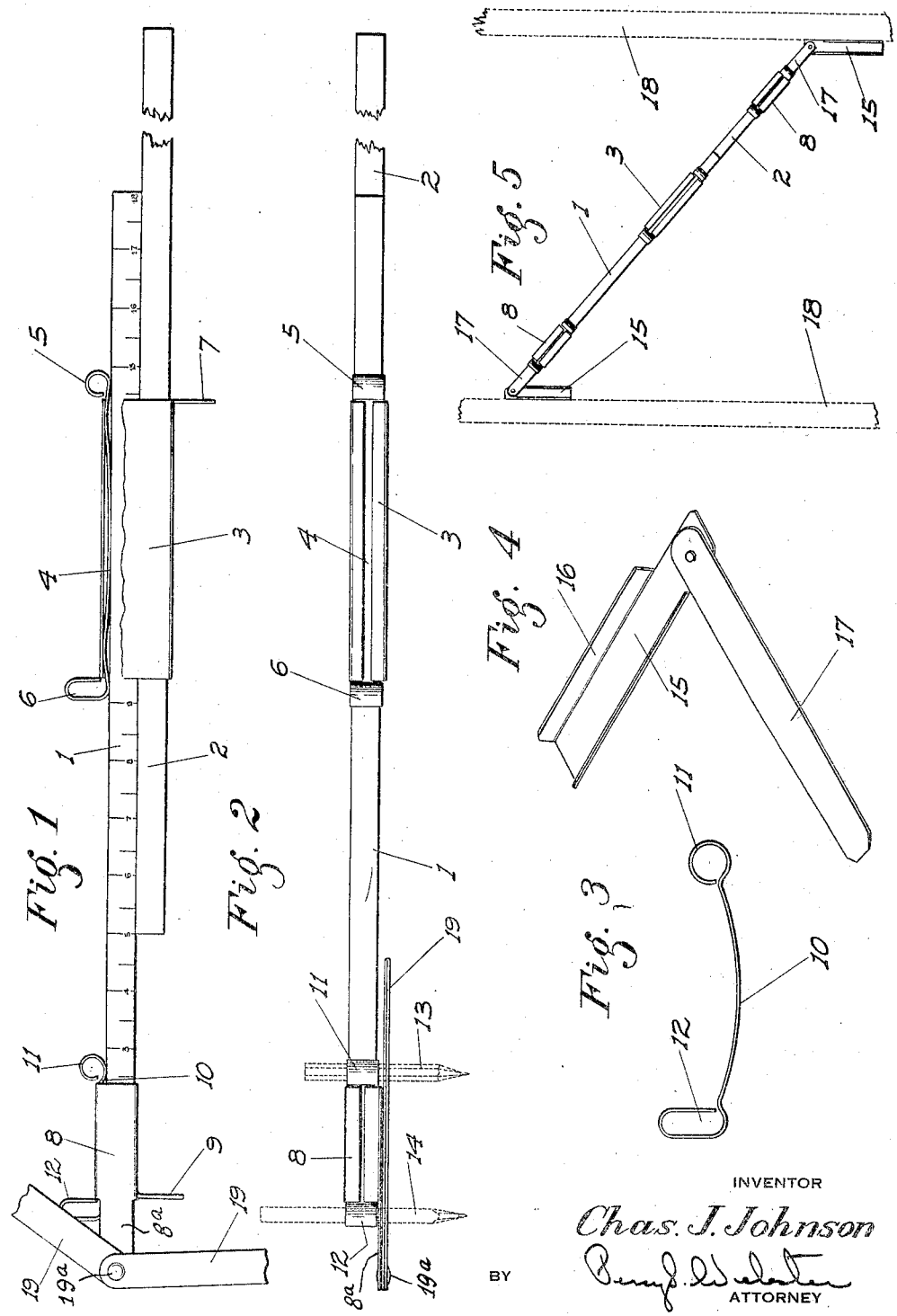
INVENTOR
Chas. J. Johnson
BY
ATTORNEY Patented May 17, 1927.

1,629,106

UNITED STATES PATENT OFFICE.

CHARLES JOSEPH JOHNSON, OF SACRAMENTO, CALIFORNIA.

HANDY MEASURING DEVICE.

Application filed August 19, 1925. Serial No. 51,128.

This invention relates to improvements in measuring devices, and particularly to what I term a handy measure especially intended for use by carpenters, pipe fitters and workers in similar trades.

The principal objects of my invention are to provide a telescopic measuring device which may be used for obtaining accurate measurements between two objects; for marking off certain distances from the edge of boards or pipes and the like; as a trammel for scribing circles and as a calipers.

The telescopic and other adjustable features of the device are so arranged that once an adjustment is made, such adjustment will be maintained automatically without the need of set screws and the like.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a side elevation of my improved measuring device.

Fig. 2 is a plan view of the same.

Fig. 3 is a detached view of a spring used in a slide carrier.

Fig. 4 is a perspective view of an adjustable trisquare usable in connection with the measuring device.

Fig. 5 is a plan showing the measuring device and trisquares as used together for measuring angles between two fixed uprights.

Referring now more particularly to the characters of reference on the drawings, 1 and 2 denote rigid measuring bars of square cross section and disposed in overlapping relation. The member 1 may be termed a permanent bar and is preferably graduated in inches or other units of measurement throughout its length. The member 2 is not graduated and may be called a temporary or replaceable bar, being preferably cut to a suitable length for each job.

In order to enable the bar 2, after having once been used to be discarded if necessary and another one employed to take its place, I make the parts of the device so that use may be made of the ¾ x ¾ sticks used in connection with plastering operations and found on all building jobs, or at least readily obtainable at any time.

To connect the bars 1 and 2 together in slidable or telescopic relation, I provide a rectangular metal slide or yoke 3 which embraces both bars for a certain extent of their length. This slide is deeper than the depth of the two superimposed bars, thus leaving room for a flat and normally convexly curved spring 4 to be inserted between one of the bars and the adjacent face of the slide.

The ends of the spring are bent outwardly of the slide and toward each other to form loops 5 and 6, one circular and the other more or less oval. These loops serve two purposes. They may be used to hold ordinary round or flat pencils respectively or the loop 5 may receive a nail for the purpose hereinafter seen. The loops also serve to engage the ends of the slide when the latter is removed from the bars, since the normal shape of the spring is concave relative to the edge face of the slide against the ends of which the loops bear. When the slide is removed from the bar the loops are pulled by the spring action into frictional engagement with said ends of the slide, and the spring will therefore remain in position in the slide and will not tend to fall out or drop inwardly of the same. As long as the slide is on the bar the spring obviously cannot move lengthwise of the slide to any extent on account of the loops on the spring. Thus I eliminate the need of other securing means between said spring and the slide.

From one end of the face of the slide opposite to that in which the spring is located a flange 7 depends.

Slidable on either the bars 1 or 2 (which are of equal cross sectional shape) is a carrier 8 having a flange 9 similar to the flange 7 depending from one end thereof. A spring 10 similar in shape to the spring 4 is mounted in the carrier 8 opposite to the flange 9 to bear against the bar on which said carrier is mounted. This spring has loops 11 and 12 at its ends, of the same nature as the loops 5 and 6 previously described, to hold round or flat pencils as indicated at 13 and 14 respectively.

In operation the bar 2 is cut to a certain and exact length such as may be found suitable for the purpose. If the inner end of the bar 2 is then set at a certain graduated mark on the bar 1, as shown in Fig. 1, the distance between the outer ends of the bars will of course be the length of the bar 2 plus that portion of the bar 1 from said graduated mark to the adjacent end of the bar 1. The spring 4 is of sufficient strength so that the bars 1 and 2 will remain in that position or any other to which they may be adjusted, without them slipping, with ordinary handling; the device may therefore be used for readily laying off lengths of any number of pieces which are to be cut the same length, without the need of individual calculation for each piece. In this case the carrier 8 may be removed from the bar if desired. If a distance between two objects which is less than the length of the bar 2 is to be calipered, such as the distance between or from the opposite faces of a pair of uprights, the carrier 8 and slide 3 are adjusted lengthwise of the bars until the flanges 9 and 7 abut against the desired surfaces of the uprights. This will give an accurate measurement between such surfaces which may be used for any purpose necessary.

The flanges 7 and 9, being formed integral with the slides, which are of thin sheet metal, are also thin. This enables the flanges being used for outside or inside measuring, sufficient accuracy for ordinary purposes being obtained in either case.

If circles are to be scribed a pencil is mounted in one or the other of the loops 11 and 12, and the carrier 8 is set so that said loops are parallel to those in the slide 3. A nail is then inserted in the circular loop of the spring 4. The slide and carrier are then adjusted so that the distance between the nail and pencil represents the radius desired, when the circle may be easily scribed using the nail as the pivot or center of the curvature.

In connection with this device I make use of an adjustable trisquare for measuring angles. This square comprises a blade 15 having an upstanding flange 16 along one edge, and a thin tapered handle 17 pivoted to the blade and of a width to fit between the sides of the carrier 8 opposite to the spring 10. The latter then holds the handle firmly in position.

Therefore if two of the carriers 8 are employed, one on one bar, and one on the opposite end of the other (as shown in Fig. 5), and a square is mounted in each such carrier, the length and angle of the ends of a diagonal brace to be placed between two uprights 18 may be easily found. Similarly the angle of cut for the ends of rafters may be ascertained.

The trisquare, being separate from the other parts of the device, may be used alone in the usual manner for small work if desired.

If desired however, a pair of blades 19 may be permanently pivoted in common on one end of the carrier 8. For this purpose, the slide at its outer end would have an extension $8^a$ along one side; the blades 19 being pivoted onto this extension by a single rivet $19^a$ or the like. These blades are thin, and when folded to lie alongside the slide, do not interfere with the insertion of the member 17 between the spring 10 and adjacent bar, nor with the operation of the blades 15. These blades may of course be turned to set at any desired angle relative to each other, as shown in Fig. 1, or may be folded to lie alongside the carrier as in Fig. 2. This arrangement of blades would be especially useful in measuring and laying off the ends of rafters and braces, as well as for other work requiring angle cuts.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A measuring device including a bar, a slide movable thereon, a flat spring extending lengthwise between adjacent faces of the slide and bar, and rigid loops of different shapes projecting outwardly from both ends of the spring transversely thereof and outwardly of the slide.

2. A measuring device including a bar, a slide movable thereon, a spring between adjacent faces of the slide and bar, and an adjustable trisquare device which includes a thin handle to extend lengthwise of the bar and to detachably project through the slide and fit between the spring and the adjacent face of the bar.

In testimony whereof I affix my signature.

CHARLES JOSEPH JOHNSON.